US011915318B2

(12) United States Patent
Slusar et al.

(10) Patent No.: US 11,915,318 B2
(45) Date of Patent: Feb. 27, 2024

(54) CONTROLLING AUTONOMOUS VEHICLES TO OPTIMIZE TRAFFIC CHARACTERISTICS

(71) Applicant: Allstate Insurance Company, Northbrook, IL (US)

(72) Inventors: Mark Slusar, Chicago, IL (US); Surender Kumar, Palatine, IL (US); Sunil Chintakindi, Menlo Park, CA (US)

(73) Assignee: Allstate Insurance Company, Northbrook, IL (US)

( * ) Notice: Subject to any disclaimer, the term of this patent is extended or adjusted under 35 U.S.C. 154(b) by 505 days.

(21) Appl. No.: 17/218,414

(22) Filed: Mar. 31, 2021

(65) Prior Publication Data

US 2021/0217101 A1  Jul. 15, 2021

Related U.S. Application Data

(63) Continuation of application No. 15/918,597, filed on Mar. 12, 2018, now Pat. No. 10,970,788, which is a (Continued)

(51) Int. Cl.
*G06Q 40/08* (2012.01)
*G08G 1/00* (2006.01)
(Continued)

(52) U.S. Cl.
CPC .......... *G06Q 40/08* (2013.01); *G08G 1/0112* (2013.01); *G08G 1/0129* (2013.01);
(Continued)

(58) Field of Classification Search
CPC .... G06Q 40/08; G08G 1/0112; G08G 1/0129; G08G 1/0145; G08G 1/0962;
(Continued)

(56) References Cited

U.S. PATENT DOCUMENTS 6,026,784 A    2/2000  Weisman et al.
6,868,386 B1   3/2005  Henderson et al.
(Continued)

FOREIGN PATENT DOCUMENTS

WO    2015160859 A1    10/2015

OTHER PUBLICATIONS

Matheson, Rob, "Smarter Driving, Using Your Phone: App that rates drivers' behavior yield promising safety results on the road," from MIT News, Jan. 5, 2016, retrieved Sep. 19, 2016, from http://news.mit.edu/2016/startup-smartphone-app-safe-driving-0105, 3 pages.

(Continued)

*Primary Examiner* — Basil T. Jos
(74) *Attorney, Agent, or Firm* — Polsinelli PC

(57) ABSTRACT

Aspects of the disclosure relate to controlling autonomous vehicles to optimize traffic characteristics. A computing platform may receive vehicle guidance data from autonomous vehicle control systems of vehicles. Subsequently, the computing platform may identify a number of the vehicles currently operating in an autonomous mode based on the vehicle guidance data. Thereafter, the computing platform may identify a target number of the vehicles to be operated in an autonomous mode in order to optimize traffic characteristics. Then, the computing platform may generate messages directing selected vehicles to switch into autonomous mode in order to achieve the target number. Subsequently, the computing platform may send the messages directing the selected vehicles to switch into autonomous mode in order to receive incentives. Thereafter, the computing platform may award the incentives to the selected vehicles that switch into the autonomous mode as directed by the messages.

20 Claims, 13 Drawing Sheets

Related U.S. Application Data continuation of application No. 15/385,344, filed on Dec. 20, 2016, now Pat. No. 9,947,052.

(51) Int. Cl.
*G08G 1/01* (2006.01)
*G08G 1/0962* (2006.01)
*G08G 1/0967* (2006.01)
*G08G 1/0968* (2006.01)

(52) U.S. Cl.
CPC ......... *G08G 1/0145* (2013.01); *G08G 1/0962* (2013.01); *G08G 1/096716* (2013.01); *G08G 1/096741* (2013.01); *G08G 1/096775* (2013.01); *G08G 1/096816* (2013.01); *G08G 1/096838* (2013.01); *G08G 1/20* (2013.01)

(58) Field of Classification Search
CPC ....... G08G 1/096716; G08G 1/096741; G08G 1/096775; G08G 1/096816; G08G 1/096838; G08G 1/20
See application file for complete search history.

(56) References Cited

U.S. PATENT DOCUMENTS

| | | | |
|---|---|---|---|
| 8,255,275 B2 | 8/2012 | Collopy et al. | |
| 8,332,242 B1 | 12/2012 | Medina, III | |
| 8,489,433 B2 | 7/2013 | Altieri et al. | |
| 8,595,037 B1 | 11/2013 | Hyde et al. | |
| 8,606,512 B1 | 12/2013 | Bogovich et al. | |
| 8,805,707 B2 | 8/2014 | Schumann, Jr. et al. | |
| 8,854,199 B2 | 10/2014 | Cook et al. | |
| 8,928,495 B2 | 1/2015 | Hassib et al. | |
| 9,141,995 B1 | 9/2015 | Brinkmann et al. | |
| 9,165,477 B2 | 10/2015 | Wilson | |
| 9,355,423 B1 | 5/2016 | Slusar | |
| 9,390,451 B1 | 7/2016 | Slusar | |
| 9,418,382 B2 | 8/2016 | Gryan et al. | |
| 9,418,383 B1 | 8/2016 | Hayward et al. | |
| 9,947,052 B1 | 4/2018 | Slusar et al. | |
| 2006/0247852 A1 | 11/2006 | Kortge et al. | |
| 2013/0297387 A1 | 11/2013 | Michael | |
| 2013/0304514 A1 | 11/2013 | Hyde et al. | |
| 2014/0097949 A1 | 4/2014 | Thompson, III | |
| 2014/0358353 A1* | 12/2014 | Ibanez-Guzman | B60W 60/0025 701/23 |
| 2015/0170287 A1 | 6/2015 | Tirone et al. | |
| 2016/0167653 A1 | 6/2016 | Malone et al. | |
| 2017/0132708 A1 | 5/2017 | Gordon et al. | |

OTHER PUBLICATIONS

"The New Auto Insurance Ecosystem: Telematics, Mobility and the Connected Car," from Cognizant Reports, Aug. 2012, retrieved from https://www.cognizant.com/InsightsWhitepapers/The-New-Auto-Insurance-Ecosystem-Telematics-Mobility-and-the-Connected-Car.pdf, 14 pages.

Yeomans, Gillian, "Autonomous Vehicles Handing Over Control: Opportunities and Risks for Insurance," from Lloyd's Exposure Management, 2014, retrieved from https://www.lloyds.com/~/media/lloyds/reports/emerging%20risk%20reports/autonomous%20vehicles%20final.pdf, 27 pages.

"GPS Fleet tracking solution driven by Driver Rewards," Azuga Social Telematics, retrieved Sep. 19, 2016, from http://www.azuga.com/fleet-gps/azuga-driver-rewards/, 6 pages.

Mar. 8, 2018—(WO) International Search Report & Written Opinion—PCT/US17/67318.

International Preliminary Report on Patentability for International Application No. PCT/US2017/067318, dated Jul. 4, 2019, 9 pages.

\* cited by examiner

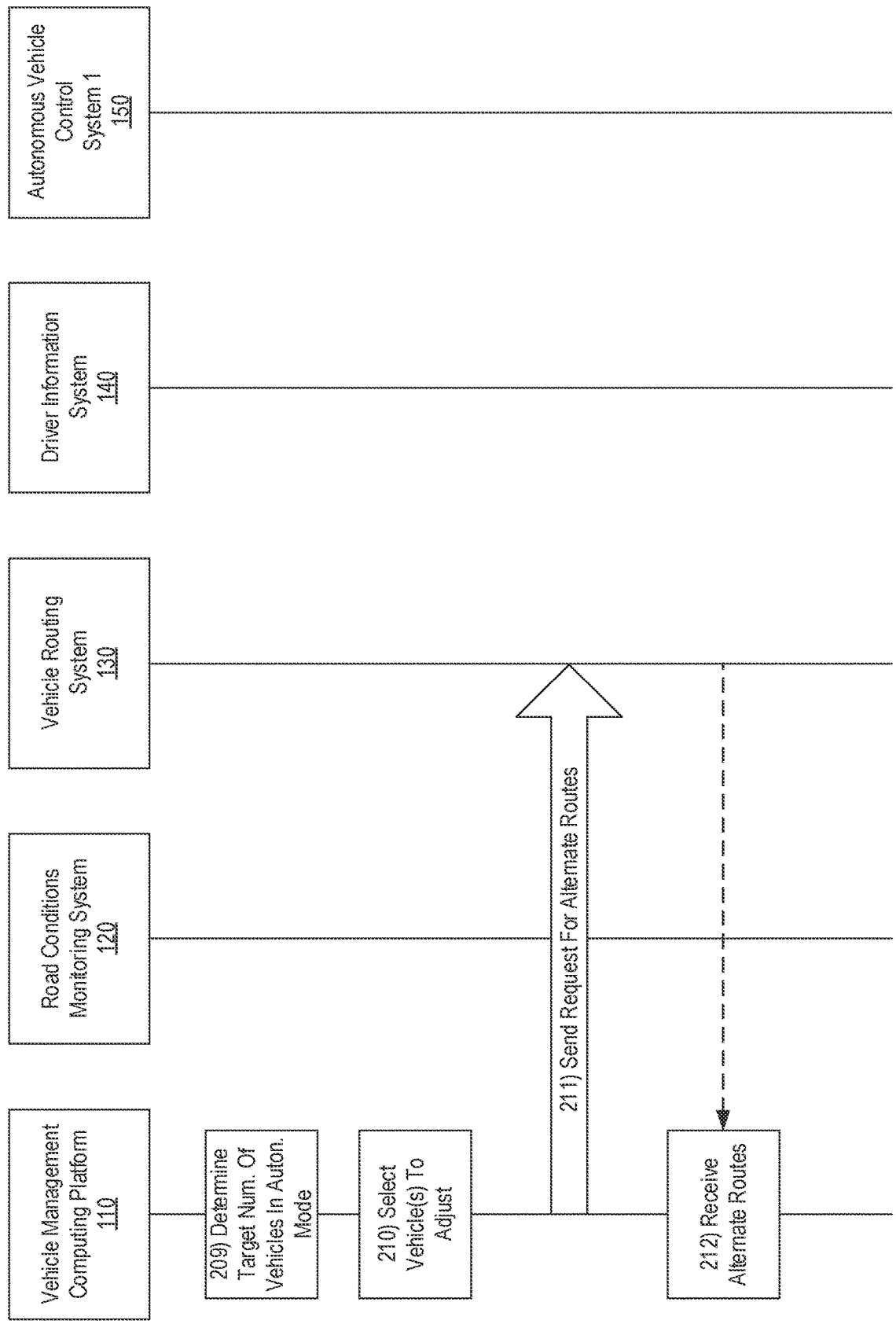

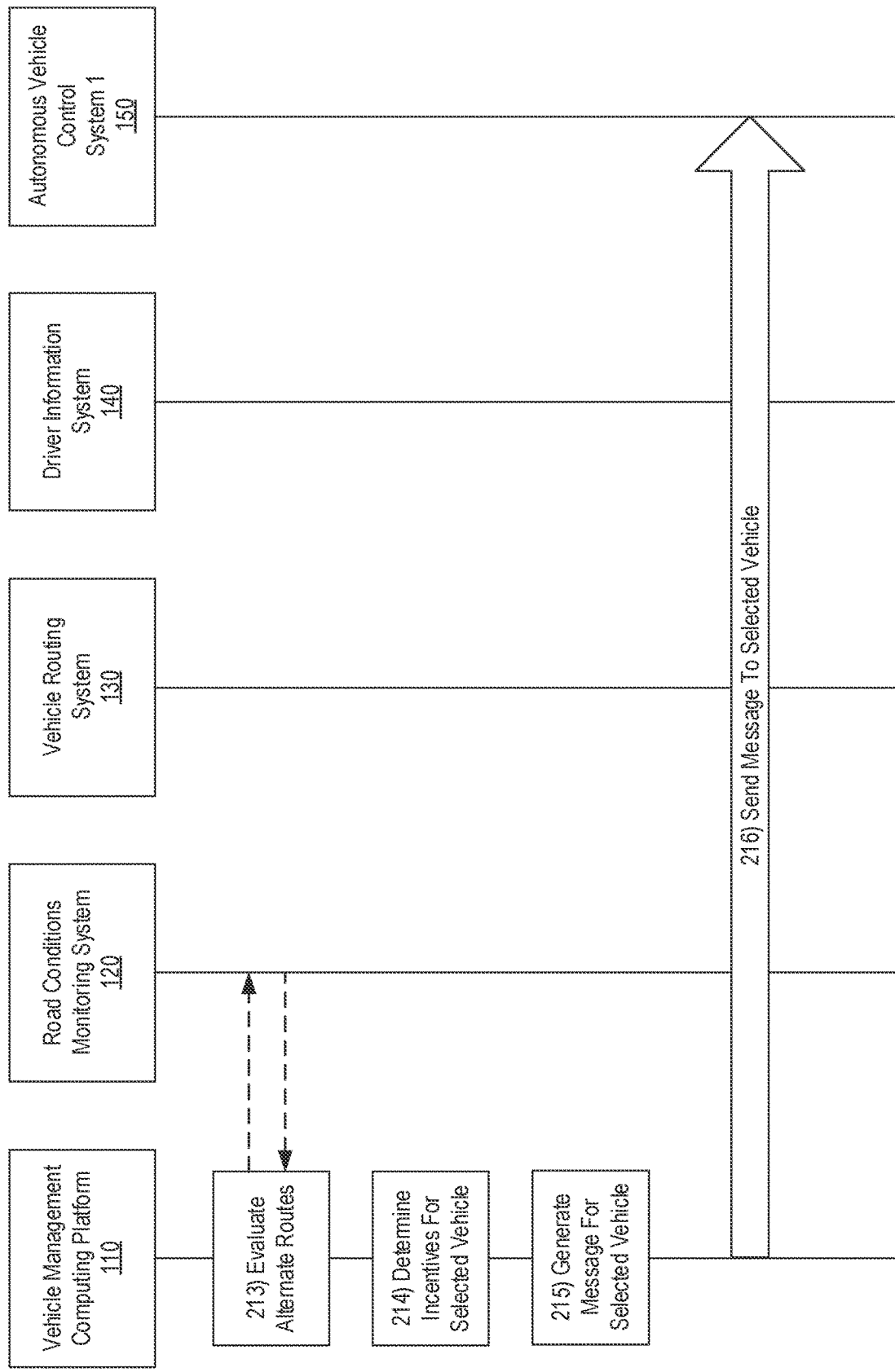

CONTROLLING AUTONOMOUS VEHICLES TO OPTIMIZE TRAFFIC CHARACTERISTICS

CROSS-REFERENCE TO RELATED APPLICATIONS

This application is a continuation of and claims priority to U.S. application Ser. No. 15/918,597, filed Mar. 12, 2018, which is a continuation of U.S. application Ser. No. 15/385,344, filed Dec. 20, 2016 and issued as U.S. Pat. No. 9,947,052 on Apr. 17, 2018, both of which are entitled "Controlling Autonomous Vehicles to Optimize Traffic Characteristics." The above referenced applications are hereby incorporated by reference herein in their entirety.

BACKGROUND

Aspects of the disclosure relate to controlling the operation of vehicle control and guidance systems for one or more autonomous vehicles. In particular, one or more aspects of the disclosure relate to providing incentives for drivers of autonomous vehicles to adjust autonomous vehicle settings in order to improve one or more traffic characteristics.

Autonomous vehicles are becoming increasingly sophisticated as satellite navigation technologies, traffic and pedestrian sensor technologies, and guidance technologies continue to improve. Despite advances in various technologies, however, it may be difficult to coordinate or otherwise direct autonomous vehicles to drive effectively together with other autonomous vehicles and non-autonomous vehicles. For example, different autonomous vehicles may have different capabilities, and therefore different autonomous vehicles may not coordinate effectively with other vehicles, resulting in decreased traffic characteristics such as safety, traffic flow, and average speed.

SUMMARY

Aspects of the disclosure provide effective, efficient, scalable, and convenient technical solutions that address and overcome the technical problems associated with controlling one or more vehicles including autonomous vehicles, particularly in instances in which autonomous vehicles are controlled to improve traffic characteristics such as safety, traffic flow, or average speed.

In accordance with one or more embodiments, a computing platform having at least one processor, a memory, and a communication interface may receive, via the communication interface, vehicle guidance data associated with vehicles from autonomous vehicle control systems of the vehicles. Subsequently, the computing platform may identify a number of the vehicles currently operating in an autonomous mode based on the vehicle guidance data. Thereafter, the computing platform may identify a target number of the vehicles to be operated in an autonomous mode in order to optimize one or more traffic characteristics for the vehicles. Then, the computing platform may generate one or more messages directing selected vehicles to switch into autonomous mode in order to achieve the target number and/or may generate one or more messages directing selected vehicles to present incentives to switch into autonomous mode in order to achieve the target number. Subsequently, the computing platform may send, via the communication interface, to autonomous vehicle control systems of the selected vehicles, the one or more messages directing the selected vehicles to switch into autonomous mode in order to receive incentives and/or may send the one or more messages directing the selected vehicles to present the incentives to switch into autonomous mode. Thereafter, the computing platform may award the incentives to the selected vehicles that switch into the autonomous mode as directed by the one or more messages.

In some embodiments, the computing platform may also generate one or more messages instructing one or more vehicles to present incentives to switch out of an autonomous mode in order to optimize the traffic characteristic. The computing platform may further send the messages to the one or more vehicles, and award the incentives to the one or more vehicles that switch out of the autonomous mode as directed by the messages.

In some embodiments, the computing platform may also generate one or more messages instructing one or more vehicles to present incentives to follow alternate routes in order to optimize the one or more traffic characteristics. The computing platform may further send the messages to the one or more vehicles, and award the incentives to the one or more vehicles that follow alternate routes as directed by the messages.

In some embodiments, the computing platform may receive vehicle guidance data from non-autonomous vehicles having non-autonomous vehicle control systems. The computing platform may further generate one or more messages instructing one or more non-autonomous vehicles to present incentives to follow alternate routes in order to optimize the one or more traffic characteristics. The computing platform may further send the messages to the one or more non-autonomous vehicles, and award the incentives to the one or more non-autonomous vehicles that follow alternate routes as directed by the messages.

In some embodiments, the computing platform may cause a portion of an incentive to be awarded based on a determination that a vehicle only partially complied with the incentive. The determination may comprise determining that the vehicle followed a portion of an alternate route, switched out an autonomous mode after accepting an incentive to switch into the autonomous mode, or switched into an autonomous mode after accepting an incentive to switch out of the autonomous mode.

In some embodiments, the computing platform identifies the target number of vehicles based on one or more of the actual number of vehicles currently operating in autonomous mode, driver information corresponding to one or more drivers of the vehicles, vehicle information corresponding to the vehicles, and road conditions corresponding to one or more roads associated with the vehicles.

In some embodiments, an amount of the incentive is based on one or more of a driver score associated with a driver of a vehicle and a vehicle score associated with the vehicle. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for controlling one or more autonomous vehicles to optimize traffic characteristics in accordance with one or more example embodiments;

DETAILED DESCRIPTION

Figure 1A:
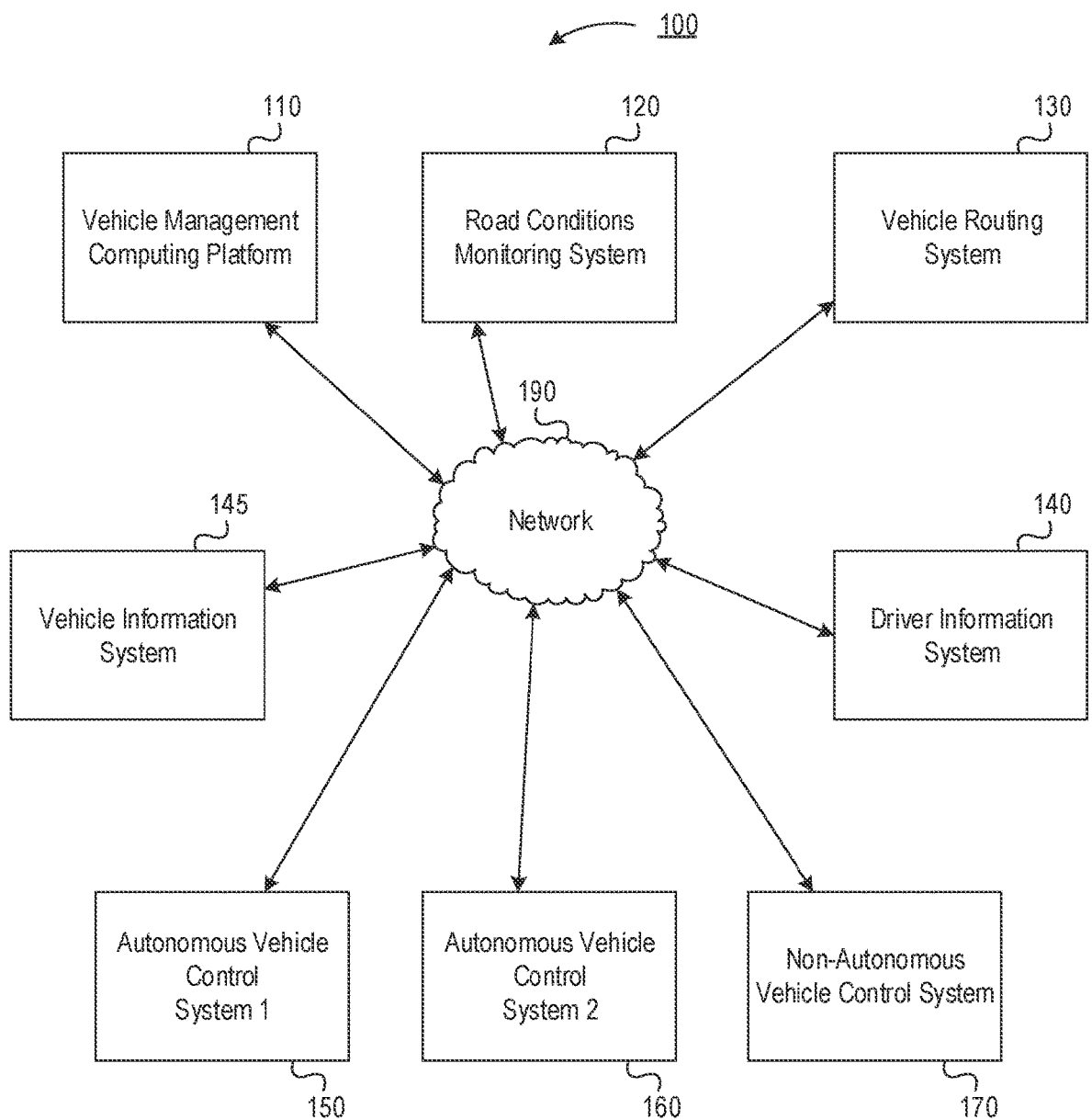
FIGS. 1A-1D depict an illustrative operating environment for controlling one or more autonomous vehicles to optimize traffic characteristics in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to controlling one or more autonomous vehicles and/or managing one or more other vehicles to optimize traffic characteristics for the one or more vehicles. In some aspects, traffic characteristics include traffic safety, traffic flow, traffic average speed, traffic maximum speed, or any other traffic characteristics. Traffic characteristics may be optimized by analyzing data related to multiple vehicles in traffic and identifying adjustments that individual vehicles can make to optimize the selected traffic characteristics.

In some embodiments, causing vehicles to switch into or out of an autonomous mode may optimize one or more traffic characteristics. In some situations, a vehicle in autonomous mode may perform better than a driver with regard to certain traffic characteristics. In other situations, a vehicle in autonomous mode may perform worse than a driver with regard to certain traffic characteristics. By identifying these situations and instructing and/or otherwise causing select vehicles to change into or out of an autonomous mode, the traffic characteristics may be optimized.

In some situations, autonomous vehicles may perform better than drivers of a given skill level. Accordingly, optimizing a traffic characteristic may include identifying the skill level of an individual driver and/or a group of drivers. Driver scores may be evaluated using information about the driver(s) such as demographic information, driving history data, tickets received by the driver, accident history data, or any other information characterizing the driver. In some situations, traffic may be optimized by causing drivers with low driver scores to change into autonomous mode and/or by causing drivers with high driver scores to change out of autonomous mode.

In some situations, certain vehicles may perform better when driven in autonomous mode than a driver, whereas other vehicles may perform better when driven in a non-autonomous mode. Accordingly, optimizing a traffic characteristic may include calculating and/or otherwise determining a vehicle score for an individual vehicle or a group of vehicles. A vehicle score may be calculated and/or otherwise determined using information about the vehicle(s) including autonomous mode effectiveness ratings for a given vehicle. Such effectiveness ratings may include, for example, a safety rating of an autonomous mode for a certain vehicle. The safety rating may be calculated and/or otherwise determined based on a number and/or type of sensors used by the autonomous mode, an accident history of the vehicle or vehicles with the same make and/or model when driven in autonomous mode, and/or any other data characterizing the safety of the vehicle when driven in autonomous mode. Other effectiveness ratings may be calculated and/or otherwise determined based on similar data characterizing effectiveness for other traffic characteristics, such as traffic flow. Vehicles scores may additionally or alternatively be calculated and/or otherwise determined based on maintenance data for the vehicle, crash safety ratings of the vehicle, capabilities of the vehicle, or any other data characterizing the effectiveness of the vehicle for a given traffic characteristic. Accordingly, in some situations, traffic may be optimized by causing vehicles with high effectiveness scores to change into autonomous mode and/or by causing vehicles with low effectiveness scores to change out of autonomous mode.

In some situations, certain vehicles may perform better when driven in autonomous mode during certain weather conditions, when driven on roads of a certain type (e.g., urban vs. rural, local vs. highway, etc.), when driven on roads with certain lane widths, or otherwise depending on road conditions. Accordingly, optimizing a traffic characteristic may include identifying and/or otherwise determining one or more road conditions of roads associated with a driver or group of drivers. In some situations, traffic may be optimized by causing vehicles driving in certain road conditions to change into or out of autonomous mode.

In some situations, certain vehicles may perform better when driven in autonomous mode when a certain number, or a certain percentage, of other vehicles are being driving in autonomous mode. Accordingly, optimizing a traffic characteristic may include identifying a number of vehicles being driven in an autonomous mode, and switching one or more vehicles into or out of autonomous mode based on the number or percentage of vehicles being driven in an autonomous mode.

In some situations, optimizing a traffic characteristic may include identifying a target number of vehicles for driving in autonomous mode based on one or more conditions, including driver scores, vehicle scores, road conditions, and a number of vehicles being driven in an autonomous mode. In some situations, after identifying a target number of vehicles for driving in autonomous mode, traffic may be optimized by causing one or more vehicles to switch into or out of autonomous mode in order to achieve the target number.

In some situations, incentives may be provided to encourage drivers to allow their vehicles to be adjusted into or out of an autonomous mode. In some situations, incentives may include free or discounted goods or services such as free tolls, discounted access to priority lanes, discounts on vehicle insurance, and the like. In some situations, incentives may include modifications to traffic control, such as allocating autonomous-only roads or lanes, allowing a higher speed limit for a vehicle or a group of vehicles, adjusting timing of traffic lights, and the like.

In some situations, messages containing incentive information may be sent to selected drivers. The messages may be displayed on a display of the driver's vehicle or smart device. In some situations, drivers may accept or decline the incentive. In some situations, vehicle control systems may automatically accept or decline the incentive. In some situations, when the incentive is accepted, the driver's vehicle may automatically be adjusted into or out of an autonomous mode as instructed by the message. Drivers may be awarded the incentives after accepting the incentives.

In some situations, a driver's compliance with an accepted incentive may be monitored. For example, a driver may switch back out of an autonomous mode shortly after accepting an incentive to switch into an autonomous mode. In some situations, a driver may be awarded a partial incentive based on a length of time or a distance driven in compliance with the incentive.

In some situations, traffic characteristics may additionally or alternatively be optimized by selecting alternate routes for one or more vehicles. Accordingly, in some situations, one or more vehicles may be offered incentives to follow alternate routes. Vehicles may be monitored and awarded incentives when they follow the alternate routes. In some situations, vehicles that only follow part of an alternate route may receive a partial incentive. In some situations, non-autonomous vehicles may be offered incentives to follow alternate routes.

FIGS. 1A, 1B, 1C, and 1D depict an illustrative operating environment for controlling one or more autonomous vehicles to optimize traffic characteristics in accordance with one or more example embodiments. Referring to FIG. 1A, operating environment 100 may include a vehicle management computing platform 110, a road conditions monitoring system 120, a vehicle routing system 130, a driver information system 140, a vehicle information system 145, an autonomous vehicle control system 150, an autonomous vehicle control system 160, and a non-autonomous vehicle control system 170. In one or more arrangements, vehicle management computing platform 110, road conditions monitoring system 120, vehicle routing system 130, driver information system 140, vehicle information system 145, autonomous vehicle control system 150, autonomous vehicle control system 160, and non-autonomous vehicle control system 170 may be connected by network 190, which may include one or more wired networks and/or one or more wireless networks. In addition, each of vehicle management computing platform 110, road conditions monitoring system 120, vehicle routing system 130, driver information system 140, vehicle information system 145, autonomous vehicle control system 150, autonomous vehicle control system 160, and non-autonomous vehicle control system 170 may be special purpose computing devices configured to perform specific functions, as illustrated in greater detail below, and may include specific computing components such as processors, memories, communication interfaces, and/or the like.

For example, vehicle management computing platform 110 may be configured to manage and control a group of autonomous and non-autonomous vehicles to optimize traffic characteristics such as safety and/or traffic flow, as illustrated in greater detail below. Road conditions monitoring system 120 may be configured to collect, serve, and/or otherwise provide data about road and weather conditions, such as road speed limits, lane width, accident history for a road, current weather along a road, and weather forecasts for a road. Vehicle routing system 130 may be configured to generate routes for navigating between an origin and a destination. Driver information system 140 may be configured to collect and provide information about drivers, including demographics data, accident history, and driving habits. Vehicle information system 145 may be configured to collect, serve, and/or otherwise provide information about vehicles, including vehicle capabilities, autonomous capabilities, and service history.

Autonomous vehicle control systems 150, 160 may be configured to monitor and/or send vehicle guidance data (which may include, e.g., speed data, position data, destination data, and operating status of autonomous mode) associated with corresponding autonomous vehicles to vehicle management computing platform 110 and/or one or more other computing devices included in operating environment 100. Autonomous vehicle control systems 150, 160 may be further configured to control corresponding autonomous vehicles based on commands and/or other information received from vehicle management computing platform 110 and/or one or more other computing devices included in operating environment 100.

Non-autonomous vehicle control system 170 may be configured to monitor and/or send vehicle guidance data (which may include, e.g., speed data, position data, and destination data) associated with a corresponding non-autonomous vehicle to vehicle management computing platform 110 and/or one or more other computing devices included in operating environment 100. In addition, non-autonomous vehicle control system 170 may be further configured to display one or more user interfaces. For example, non-autonomous vehicle control system 170 may be configured to display one or more user interfaces for responding to messages received from vehicle management computing platform 110 and/or one or more other computing devices included in operating environment 100.

Figure 1B:
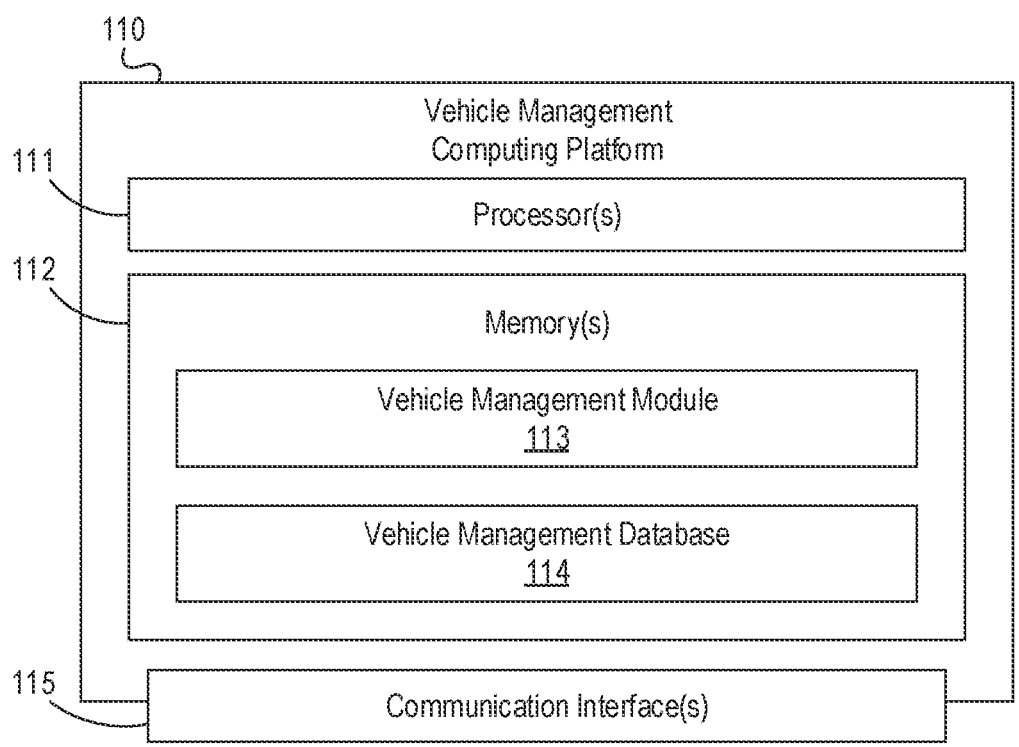

Referring to FIG. 1B, vehicle management computing platform 110 may include a processor 111, memory 112, and a communication interface 115. Processor 111 may control operations of vehicle management computing platform 110, and memory 112 may store instructions that, when executed by processor 111, cause vehicle management computing platform 110 to perform one or more functions. Communication interface 115 may include one or more wired and/or wireless network interfaces, and communication interface 115 may connect vehicle management computing platform 110 to one or more networks (e.g., network 190) and/or enable vehicle management computing platform 110 to exchange information and/or otherwise communicate with one or more devices connected to such networks. Memory 112 may store and/or otherwise provide a vehicle management module 113 and a vehicle management database 114. Vehicle management module 113 may store instructions that, when executed by processor 111, cause vehicle management computing platform 110 to manage one or more autonomous vehicles to optimize traffic characteristics, offer incentives, and/or perform one or more other functions. Vehicle management database 114 may store information that may be used by vehicle management computing platform 110 in controlling autonomous vehicles to optimize traffic characteristics and/or in performing one or more other functions.

Figure 1C:
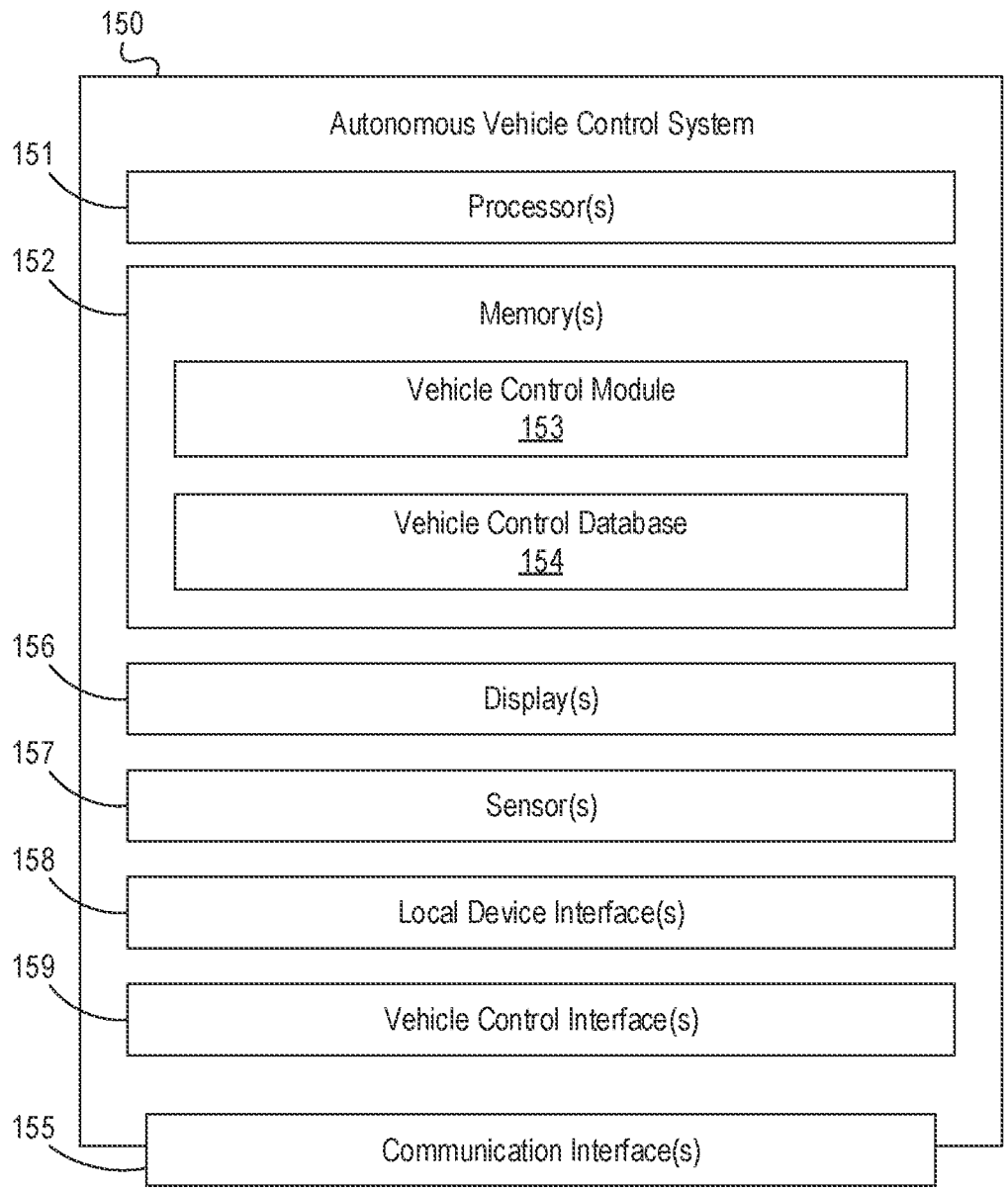

Referring to FIG. 1C, autonomous vehicle control system 150 may include a processor 151, memory 152, and a communication interface 155. Processor 151 may control operations of autonomous vehicle control system 150, and memory 152 may store instructions that, when executed by processor 151, cause autonomous vehicle control system 150 to perform one or more functions. Communication interface 155 may include one or more wired and/or wireless network interfaces, and communication interface 155 may connect autonomous vehicle control system 150 to one or more networks (e.g., network 190) and/or enable autonomous vehicle control system 150 to exchange information and/or otherwise communicate with one or more devices connected to such networks. Memory 152 may store and/or otherwise provide a vehicle control module 153 and a vehicle control database 154. Vehicle control module 153 may store instructions that, when executed by processor 151, cause autonomous vehicle control system 150 to monitor and/or control an autonomous vehicle in which autonomous vehicle control system 150 may be installed and/or perform one or more other functions. Vehicle control database 154 may store information that may be used by autonomous vehicle control system 150 in monitoring and/or controlling an autonomous vehicle in which autonomous vehicle control system 150 may be installed and/or in performing one or more other functions.

Autonomous vehicle control system 150 also may include a display 156, sensors 157, a local device interface 158, and a vehicle control interface 159. Display 156 may display one or more user interfaces to a driver and/or passengers of the vehicle containing autonomous vehicle control system 150. Display 156 may accept input (e.g., via a touchscreen interface) or be associated with one or more user interfaces that accept input related to the displayed user interfaces. Sensors 157 may sense conditions associated with an autonomous vehicle in which autonomous vehicle control system 150 may be installed and may output analog signal data and/or digital signal data to autonomous vehicle control system 150. Such data may include engine data, performance data, navigation data, position data, speed data, and/or other vehicle data. Local device interface 158 may include one or more wired and/or wireless communication interfaces and may, for example, enable autonomous vehicle control system 150 to exchange information with and/or otherwise communicate with one or more devices that may be located inside of, close to, and/or within a predetermined distance of an autonomous vehicle in which autonomous vehicle control system 150 may be installed. For example, local device interface 158 may enable autonomous vehicle control system 150 to communicate with one or more smart phones, tablet computers, and/or other mobile computing devices that may be used by and/or otherwise associated with a driver of and/or one or more passengers of an autonomous vehicle in which autonomous vehicle control system 150 may be installed. Vehicle control interface 159 may include one or more wired and/or wireless communication interfaces and may, for example, enable autonomous vehicle control system 150 to exchange information with and/or otherwise communicate with one or more devices and/or components of an autonomous vehicle in which autonomous vehicle control system 150 may be installed so as to direct and/or control the autonomous vehicle in which autonomous vehicle control system 150 may be installed. For example, vehicle control interface 159 may enable autonomous vehicle control system 150 to accelerate and/or decelerate the autonomous vehicle in which autonomous vehicle control system 150 may be installed, steer the autonomous vehicle in which autonomous vehicle control system 150 may be installed, direct the autonomous vehicle in which autonomous vehicle control system 150 may be installed to one or more specific locations, drive the autonomous vehicle in which autonomous vehicle control system 150 may be installed, and/or otherwise control operations of the autonomous vehicle in which autonomous vehicle control system 150 may be installed.

Figure 1D:
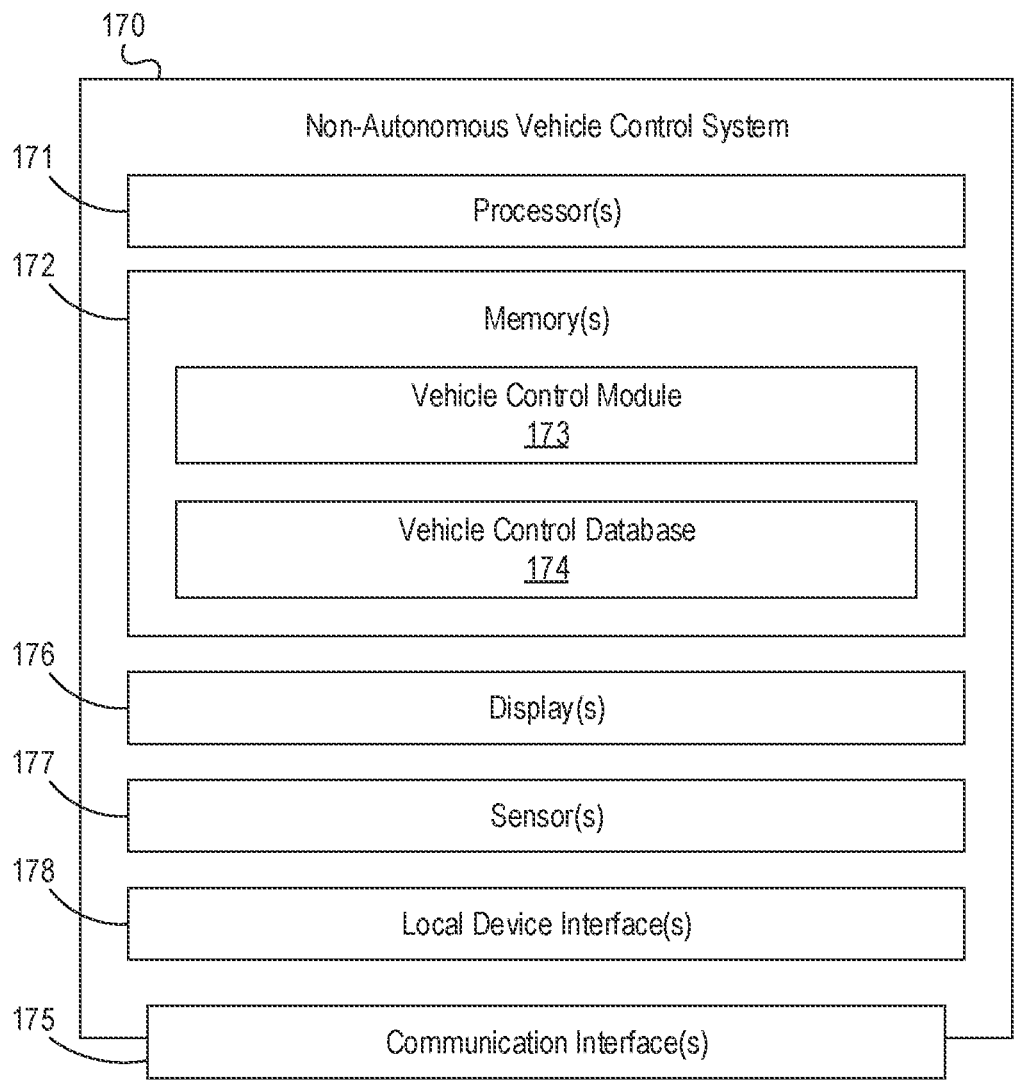

Referring to FIG. 1D, non-autonomous vehicle control system 170 may include a processor 171, memory 172, and a communication interface 175. Processor 171 may control operations of non-autonomous vehicle control system 170, and memory 172 may store instructions that, when executed by processor 171, cause non-autonomous vehicle control system 170 to perform one or more functions. Communication interface 175 may include one or more wired and/or wireless network interfaces, and communication interface 175 may connect non-autonomous vehicle control system 170 to one or more networks (e.g., network 190) and/or enable non-autonomous vehicle control system 170 to exchange information and/or otherwise communicate with one or more devices connected to such networks. Memory 172 may store and/or otherwise provide a vehicle control module 173 and a vehicle control database 174. Vehicle control module 173 may store instructions that, when executed by processor 171, cause non-autonomous vehicle control system 170 to control one or more functions of a vehicle in which non-autonomous vehicle control system 170 may be installed. Vehicle control database 174 may store information that may be used by non-autonomous vehicle control system 170 in controlling functions of a vehicle in which non-autonomous vehicle control system 170 may be installed and/or in performing one or more other functions. Non-autonomous vehicle control system 170 also may include a display 176, sensors 177, and a local device interface 178. Display 176 may display one or more user interfaces to a driver and/or passengers of the vehicle containing non-autonomous vehicle control system 170. Display 176 may accept input (e.g., via a touchscreen interface) or be associated with one or more user interfaces that accept input related to the displayed user interfaces. Sensors 177 may sense conditions associated with a vehicle in which non-autonomous vehicle control system 170 may be installed and may output analog signal data and/or digital signal data to non-autonomous vehicle control system 170. Such data may include engine data, performance data, navigation data, position data, speed data, and/or other vehicle data. Local device interface 178 may include one or more wired and/or wireless communication interfaces and may, for example, enable non-autonomous vehicle control system 170 to exchange information with and/or otherwise communicate with one or more devices that may be located inside of, close to, and/or within a predetermined distance of a vehicle in which non-autonomous vehicle control system 170 may be installed. For example, local device interface 178 may enable non-autonomous vehicle control system 170 to communicate with one or more smart phones, tablet computers, and/or other mobile computing devices that may be used by and/or otherwise associated with a driver of and/or one or more passengers of a vehicle in which non-autonomous vehicle control system 170 may be installed.

Figure 2A:
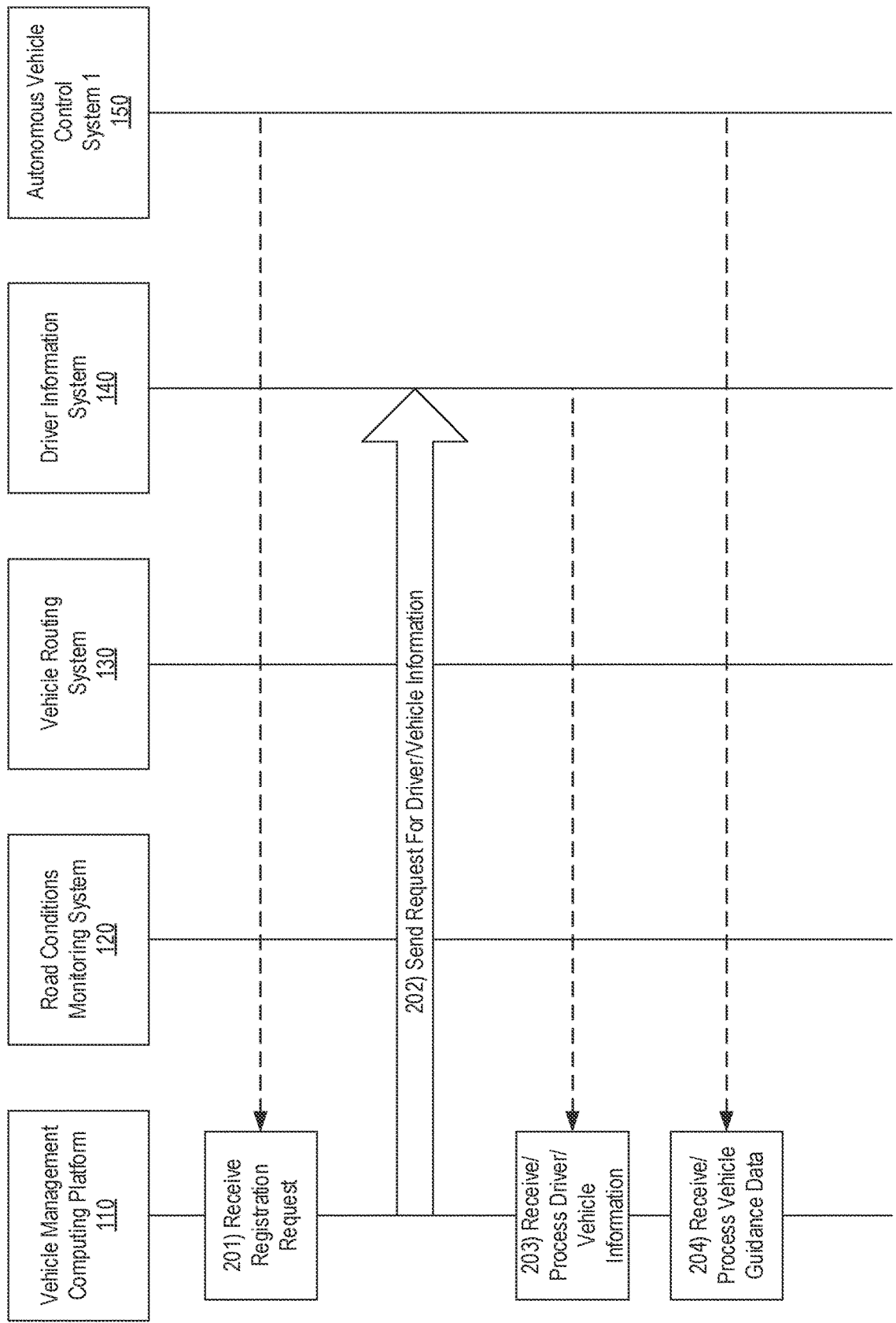

FIGS. 2A, 2B, 2C, 2D, and 2E depict an illustrative event sequence for controlling one or more autonomous vehicles to optimize traffic characteristics in accordance with one or more example embodiments. Referring to FIG. 2A, at step 201, vehicle management computing platform 110 may receive (e.g., via communication interface 115) a registration request from autonomous vehicle control system 150. Autonomous vehicle control system 150 may send the registration request (e.g., via communication interface 155) at particular times, locations, upon instructions of an operator of a vehicle associated with autonomous vehicle control system 150, or in response to some other trigger. For example, autonomous vehicle control system 150 may send a registration request to a vehicle management computing platform 110 associated with a toll authority when the vehicle containing autonomous vehicle control system 150 enters a toll road. As another example, autonomous vehicle control system 150 may send a registration request to a vehicle management computing platform 110 associated with a local government when the vehicle containing autonomous vehicle control system 150 enters an area of the local government (e.g., a state, town, or country). As yet another example, autonomous vehicle control system 150 may send a registration request to a vehicle management computing platform 110 associated with an insurance company when the vehicle containing autonomous vehicle control system 150 is configured to be controlled by the vehicle management computing platform 110 associated with the insurance company. Registration may be initiated by autonomous vehicle control system 150 itself, by autonomous vehicle control system 150 in response to one or more directions received from another device (e.g., vehicle management computing platform 110), or in response to one or more directions received from a vehicle user (e.g., a driver or passenger of the vehicle). Registration requests may also be received at vehicle management computing platform 110 from other vehicles, such as vehicles containing autonomous vehicle control system 160 or non-autonomous vehicle control system 170.

Figure 3:
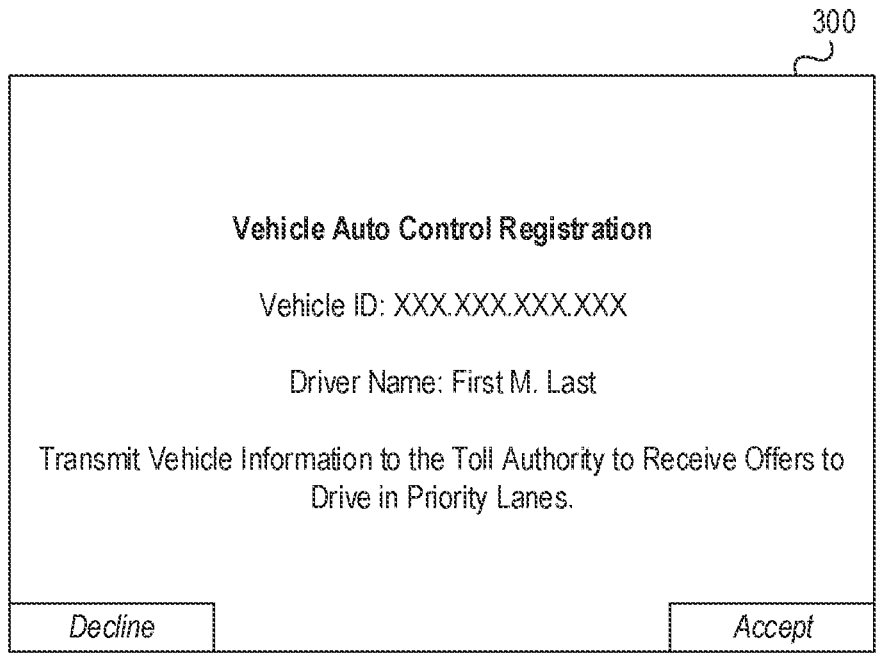
FIGS. 3 & 4 depict example graphical user interfaces for registering vehicles to a computing platform in accordance with one or more example embodiments.
Figure 4:
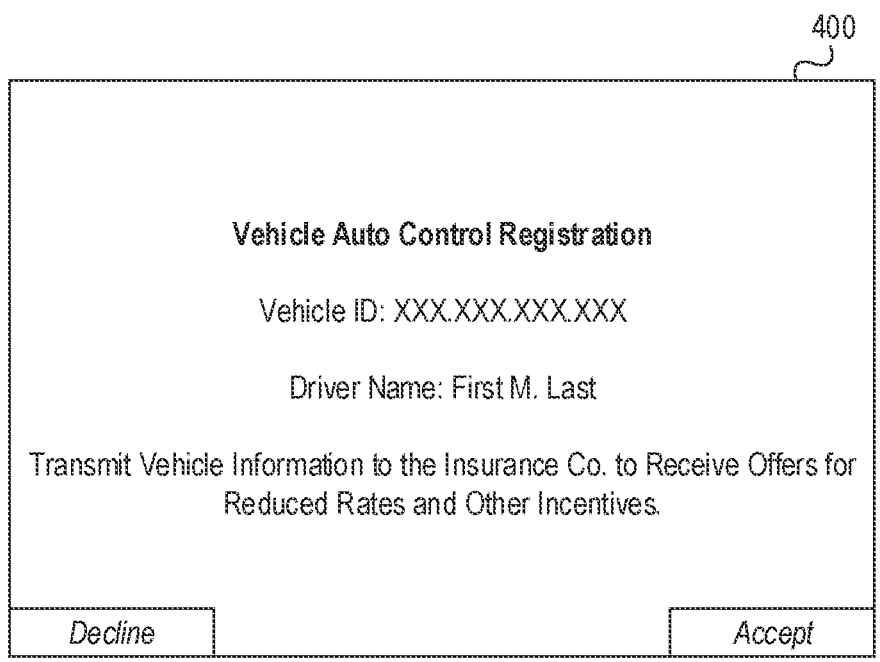

The registration request may include information such as a vehicle identifier, a driver identifier, an account identifier, a password, or any other registration information. Vehicle management computing platform 110 may generate one or more graphical user interfaces for transmission to and display by autonomous vehicle control system 150 (e.g., via display 156) by which an operator of the vehicle containing autonomous vehicle control system 150 may enter or confirm the registration information. For example, as depicted at FIGS. 3-4, a graphical user interface 300, 400 displayed via display 156 may include fields such as "Vehicle ID" and "Driver Name" for entering or confirming such identifiers. In some embodiments, the fields may be auto-populated by autonomous vehicle control system 150 using data stored in vehicle control database 154. Graphical user interfaces 300, 400 may be transmitted to and/or displayed automatically by autonomous vehicle control system 150 in certain situations, such as when a vehicle containing autonomous vehicle control system 150 is started, when a vehicle containing autonomous vehicle control system 150 enters a toll road, when a vehicle containing autonomous vehicle control system 150 crosses a border, and the like. Graphical user interfaces 300, 400 may comprise a selector that causes the registration request to be sent by autonomous vehicle control system 150 to vehicle management computing platform 110 (e.g., the illustrated "accept" button). In some examples, the registration request is transmitted automatically by autonomous vehicle control system 150 without generating a graphical user interface and/or receiving confirmation from an operator of the vehicle containing autonomous vehicle control system 150.

At step 202, vehicle management computing platform 110 may send a request for additional information about the vehicle and/or driver identified in the registration request to driver information system 140. In embodiments, the request may contain one or more identifiers of the driver and/or vehicle. In some embodiments, separate requests may be sent to a driver information system 140 and a vehicle information system 145 for respectively retrieving information about the driver and vehicle. In other embodiments, the driver information system 140 and/or the vehicle information system 145 may provide information about both the driver and the vehicle, so only one request may be sent as illustrated.

At step 203, the vehicle management computing platform 110 receives and processes (e.g., by processor 111 executing vehicle management module 113) driver information and/or vehicle information associated with the driver and/or vehicle from driver information system 140 and/or vehicle information system 145. The driver information may include an accident history for the driver, demographics data about the driver, driving habits of the driver, insurance information associated with the driver, a safety rating for the driver, or any other information about the driver of the vehicle. The vehicle information may include make/model of the vehicle, capabilities of the vehicle (e.g., stopping distance, engine size), maintenance information (e.g., last oil change, last tire change), autonomous capabilities of the vehicle (e.g., number and type of sensors), insurance information associated with the vehicle, a safety rating for the vehicle, or any other vehicle information. Vehicle management computing platform 110 may process the received information, for example, in order to calculate and/or otherwise determine a driver safety score and/or a vehicle safety score.

At step 204, vehicle management computing platform 110 may receive and process (e.g., by processor 111 executing vehicle management module 113) vehicle guidance data from autonomous vehicle control system 150 on an ongoing basis. Vehicle management computing platform 110 may receive the vehicle guidance data continually, periodically, or by request of vehicle management computing platform 110. The vehicle guidance data may include speed data, position data, destination data, operating status of an autonomous mode of the autonomous vehicle control system 150, and other such data related to navigation of the vehicle containing the autonomous vehicle control system 150. Vehicle management computing platform 110 may further process the data to calculate and/or otherwise determine additional information not contained in the vehicle guidance information. For example, vehicle management computing platform 110 may analyze position data contained within the vehicle guidance data to derive speed or direction data when vehicle guidance data does not contain such data. Vehicle management computing platform 110 may further estimate data such as destination data based on the vehicle guidance data and/or other data. For example, vehicle management computing platform 110 may estimate a destination for a vehicle based on historical data (e.g., driving habits data indicating frequent routes for a driver and/or vehicle, which may be contained in driver/vehicle information). As another example, vehicle management computing platform 110 may estimate a destination based on a time of day and/or event (e.g., if the vehicle is driving towards a football stadium before a game is about to start).

Steps 201-204 may be repeated with respect to autonomous vehicle control system 160, non-autonomous vehicle control system 170, and other vehicles containing vehicle control systems that register with vehicle management computing platform 110. Vehicle management computing platform 110 may receive similar data from non-autonomous vehicle control system 170 as from autonomous vehicle control system 150, 160. For example, vehicle management computing platform 110 may receive driver information, vehicle information, and vehicle guidance data associated with non-autonomous vehicle control system 170, but such information and/or data may indicate that non-autonomous vehicle control system 170 lacks an autonomous mode or otherwise is not configured for autonomous operation.

Figure 2B:
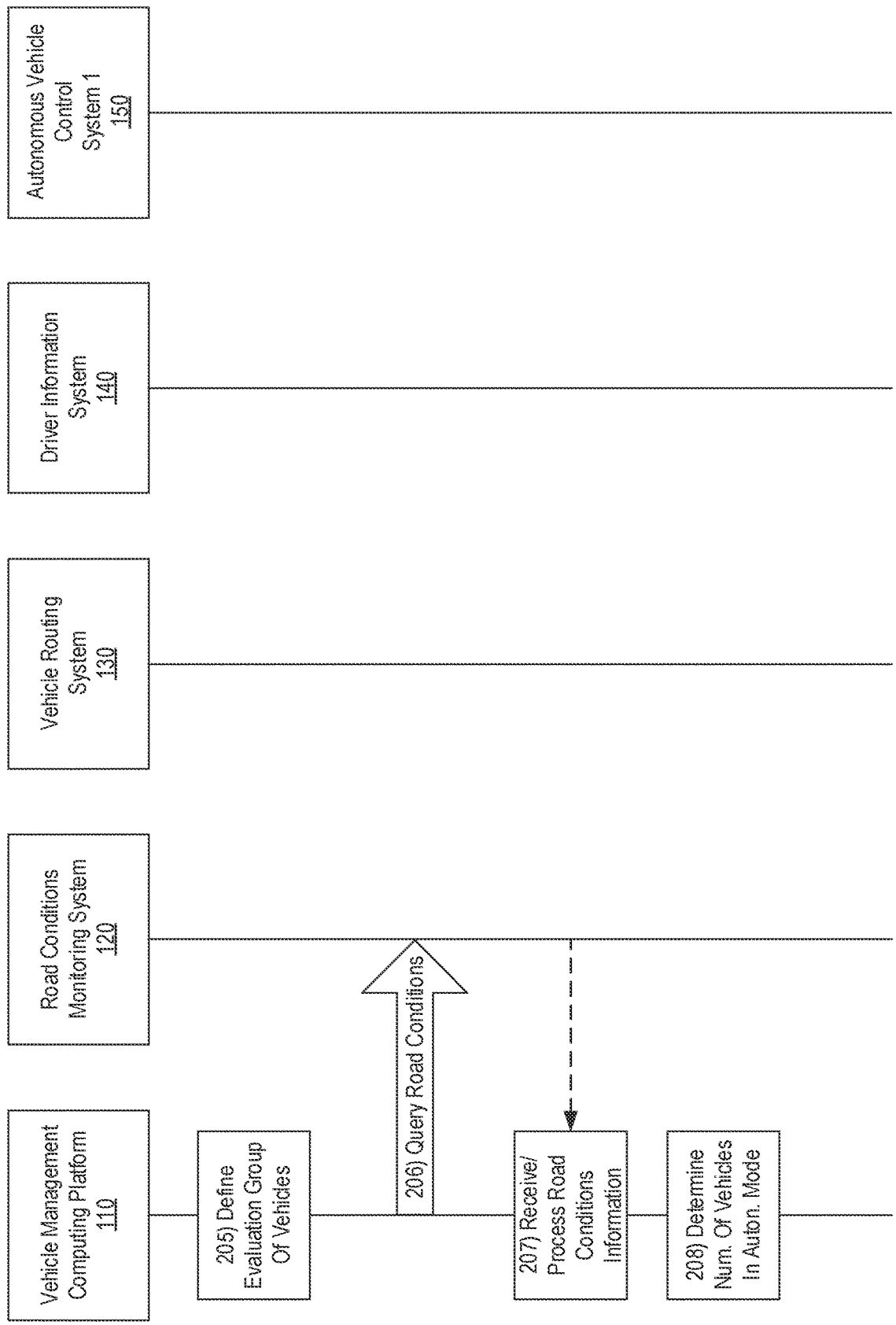
Figure 5:
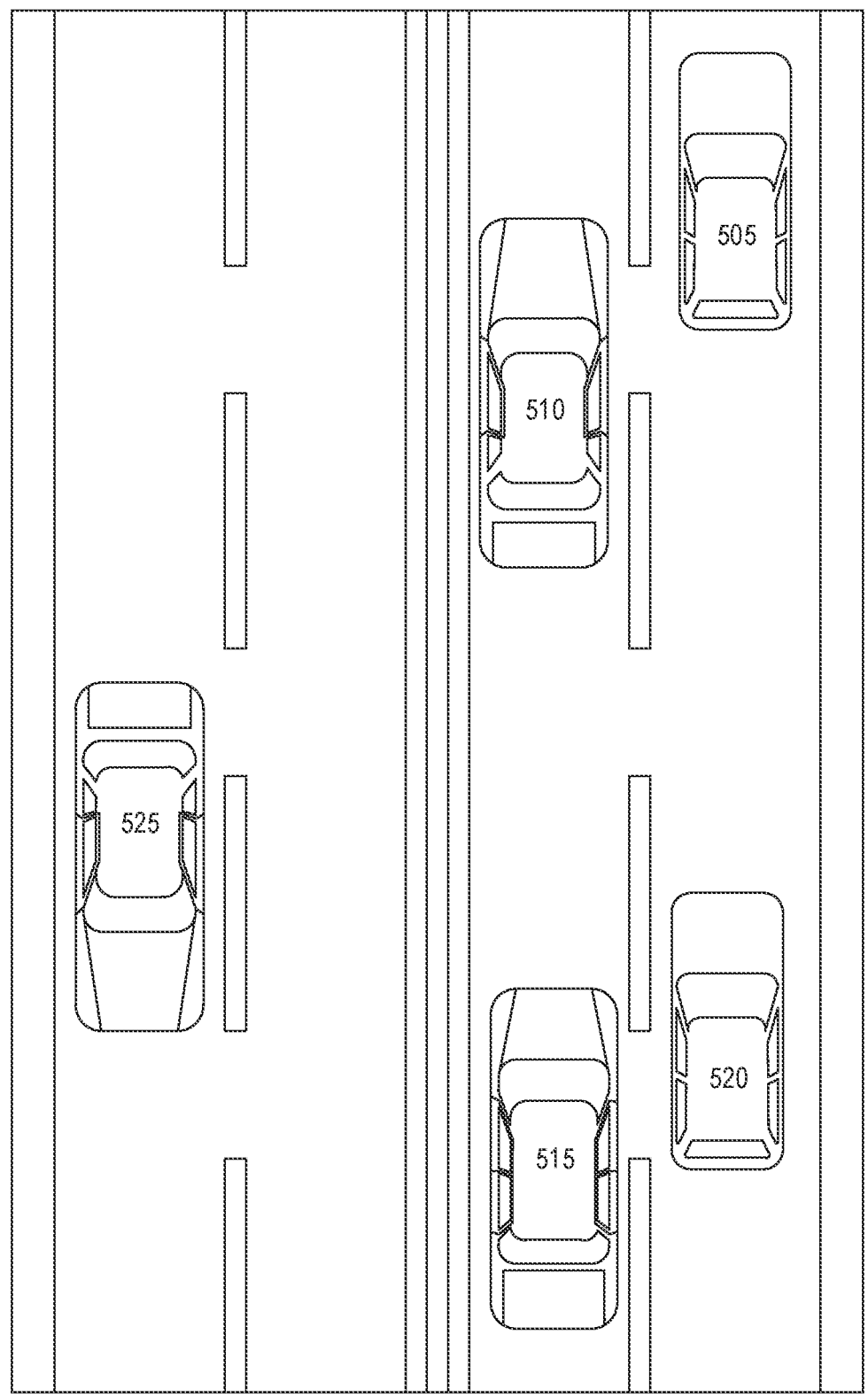
FIG. 5 depicts an illustrative group of vehicles that may be controlled in accordance with one or more example embodiments.

Referring to FIG. 2B, at step 205, vehicle management computing platform 110 defines (e.g., by processor 111 executing vehicle management module 113) an evaluation group of vehicles for which to optimize the traffic characteristic. In some embodiments, in defining the evaluation group of vehicles, vehicle management computing platform 110 may select all registered vehicles within a certain area or on a certain road. In other embodiments, in defining the evaluation group of vehicles, vehicle management computing platform 110 may select groups of vehicles that are close together (e.g., in a cluster on the road and/or otherwise within a certain distance of each other). Referring to FIG. 5, five vehicles 505, 510, 515, 520, 525 may be registered to vehicle management computing platform 110 in a certain area. Any given area may be used, including large areas such as a municipality or state. In some embodiments, areas may be defined in terms of roads such that, for example, a certain stretch of a highway may define an area. In some embodiments, vehicle management computing platform 110 may define an evaluation group containing vehicles 505, 510, 515, 520, 525 because they are all in a given area or on a given road. Accordingly, vehicle guidance data such as location may be used by vehicle management computing platform 110 to define an evaluation group of vehicles.

In some embodiments, the evaluation group may be defined to include vehicles traveling together through one or more areas. For example, vehicle management computing platform 110 may include vehicles 505, 510, 515, 520 in a first group because they are traveling together in the same direction, and may further include vehicle 525 in a separate group of vehicles traveling in the other direction. Accordingly, vehicle management computing platform 110 may use a direction or destination of vehicles to define a group of vehicles in some instances. Vehicle management computing platform 110 may identify and/or otherwise determine the direction of vehicles based on vehicle guidance data indicating the direction, location, or destination of vehicles.

In some embodiments, vehicle management computing platform 110 may define evaluation groups based on speed (s) of the vehicles. For example, if vehicles 505, 510, 515 are driving about 80 miles per hour, but vehicle 520 is only driving about 60 miles per hour, vehicles 505, 510, 515 may be included in one evaluation group and vehicle 520 may be included in another evaluation group. Accordingly, vehicle management computing platform 110 may use vehicle guidance data including speed to define an evaluation group of vehicles in some instances. In some embodiments, vehicle management computing platform 110 may define evaluation groups based on destination. For example, if vehicle guidance data indicates that vehicles 510, 515 will turn left at an upcoming fork in the road, and vehicles 505, 520 will turn right at an upcoming fork in the road, the vehicles may be included in separate evaluation groups. Accordingly, vehicle management computing platform 110 may use vehicle guidance data including destination to define an evaluation group of vehicles in some instances.

In some instances, vehicle management computing platform 110 may define evaluation groups of vehicles based on several factors including location, direction, speed, and destination of one or more vehicles. Processor 111, executing vehicle management module 113 of vehicle management computing platform 110, may retrieve, process, and or calculate one or more of such factors and input the factors into algorithms that define one or more evaluation groups of vehicles registered to vehicle management computing platform 110. Such algorithms may be implemented as part of vehicle management module 113. Such algorithms may include rules-based algorithms, supervised or unsupervised learning algorithms, clustering algorithms, neural networks, and/or other such algorithms.

At step 206, vehicle management computing platform 110 generates (e.g., by processor 111 executing vehicle management module 113) and sends (e.g., via communication interface 115) a query to road conditions monitoring system 120. Vehicle management computing platform 110 may send one or more queries requesting conditions for one or more roads within an area corresponding to the evaluation group. The vehicle management computing platform 110 may request road conditions information corresponding to one or more areas associated with the evaluation group. The query or queries may request road conditions information for roads the vehicles are currently driving on and/or roads the vehicles may be driving on in the future.

At step 207, vehicle management computing platform 110 receives (e.g., via communication interface 115) and processes (e.g., by processor 111 executing vehicle management module 113) the requested road conditions information. Vehicle management computing platform 110 may receive road conditions information comprising dynamic information such as weather, precipitation, construction, lane closures, current accidents, current traffic levels, accident history, etc. Vehicle management computing platform 110 may further receive road conditions information comprising static information such as number of lanes, lane width, speed limit, tolls, presence of autonomous-only lanes, etc. Vehicle management computing platform 110 may further process the road conditions information for the one or more roads to calculate and/or otherwise determine additional information such as a road safety score, a road congestion score, or a road-autonomous score (e.g., a score indicating the suitability of the road for autonomous vehicles given static and/or dynamic conditions of the road).

At step 208, vehicle management computing platform 110 identifies (e.g., by processor 111 executing vehicle management module 113) the number of vehicles in the evaluation group driving in autonomous mode. Vehicle management computing platform 110 may identify whether each vehicle is driving in autonomous mode based on the vehicle guidance received from each vehicle in step 204. Vehicle management computing platform 110 may check the most recently received vehicle guidance data for each vehicle in order to identify whether each vehicle is currently in an autonomous mode.

Referring to FIG. 2C, at step 209, vehicle management computing platform 110 identifies (e.g., by processor 111 executing vehicle management module 113) a target number of vehicles for operating in autonomous mode in order to optimize one or more traffic characteristics. The one or more traffic characteristics may, in some embodiments, be one or more of safety, traffic flow, traffic average speed, traffic maximum speed, and the like. Vehicle management computing platform 110 may identify the target number of vehicles for operating in autonomous mode using features extracted from and/or based on one or more of driver and/or vehicle information, vehicle guidance data, road conditions information, and the number of vehicles currently in autonomous mode. Vehicle management computing platform 110 may input such features into one or more machine learning models (which may, e.g., be maintained and/or executed by vehicle management computing platform 110), such as classifiers, support vector machines, decision trees, neural networks, and other supervised or unsupervised learning models.

The features for inputting into the machine learning models may tend to indicate that a certain ideal number or percentage, or a certain delta (e.g., number or percentage change) of vehicles should be operated in autonomous mode based on values of one or more of the features alone or in combination with other features. For example, a narrow lane width may tend to indicate that more vehicles should be driven in autonomous mode, except when the weather is snowy or rainy. As another example, a congested road may tend to indicate that more vehicles should be driven in autonomous mode, except when a history of accidents along the road indicates that several autonomous vehicles were involved in accidents along the road. The features may characterize one or more drivers or groups of drivers in the evaluation group, one or more vehicles or groups of vehicles in the evaluation group, road conditions of roads associated with the evaluation group, and/or a number of vehicles being driven in an autonomous mode. Exemplary features may include average driver scores for the drivers of the evaluation group, average vehicle safety scores for the vehicles of the evaluation group, a road safety score, a road-autonomous score, and a road congestion score.

Accordingly, the machine learning models (which may, e.g., be maintained and/or executed by vehicle management computing platform 110) may be trained using a training set of data including multiple data points having feature vectors including the various input features as well as outcome data for the desired traffic characteristic (e.g., accident history data for a safety characteristic, historic traffic flow data for a traffic flow characteristic, historic average speed data for a traffic average speed characteristic, historic maximum speed data for a traffic maximum speed characteristic, etc.). In some embodiments, a machine learning model (which may, e.g., be maintained and/or executed by vehicle management computing platform 110) may be trained for each of multiple traffic characteristics. In other embodiments, one or more machine learning models (which may, e.g., be maintained and/or executed by vehicle management computing platform 110) may be trained to each optimize multiple traffic characteristics.

After inputting the features for the current evaluation group of vehicles into the one or more machine learning models, vehicle management computing platform 110 may identify the target number of vehicles for operating in autonomous mode based on the output of the machine learning models. Each of the one or more models may output an indication of an ideal number, percentage, or change in the number or percentage of vehicles operating in autonomous mode. Vehicle management computing platform 110 may select an output of one model or combine multiple outputs from multiple models (e.g., using an average, a weighted average, a median, a mode, or some other combined value) to identify the target number.

At step 210, vehicle management computing platform 110 selects (e.g., by processor 111 executing vehicle management module 113) one or more vehicles of the evaluation group to adjust into or out of autonomous mode based on the difference between the actual number of vehicles in autonomous mode identified in step 208 and the ideal number of vehicles in autonomous mode identified in step 209. Vehicle management computing platform 110 may select vehicles from the evaluation group to control based on one or more factors associated with the vehicle, such as driver/vehicle information, vehicle guidance data for the vehicle, and road conditions information. For example, vehicle management computing platform 110 may select the vehicle or vehicles from the evaluation group having the lowest driver safety scores to change into an autonomous mode when the ideal number of vehicles in autonomous mode is less than the actual number of vehicles in autonomous mode. Conversely, vehicle management computing platform 110 may select the vehicle or vehicles from the evaluation group having the highest driver safety scores to change out of an autonomous mode when the ideal number of vehicles in autonomous mode is greater than the actual number of vehicles in autonomous mode. As another example, vehicle management computing platform 110 may identify that a driver of one of the vehicles has an accident history indicating several accidents in snowy weather conditions, and that the road conditions are currently snowy, and accordingly select that vehicle to adjust into an autonomous mode. Vehicle management computing platform 110 may further select some vehicles of the evaluation group to adjust into autonomous mode while also selecting other vehicles of the evaluation group to adjust out of autonomous mode.

At step 211, vehicle management computing platform 110 may optionally send (e.g., via communication interface 115) one or more requests for alternate routes for the vehicles selected in step 210 and/or for all or some of the vehicles of the evaluation group. Such requests may contain information about the location, destination, and/or current route of each such vehicle. Vehicle routing system 130 receives and processes the requests in order to identify alternate routes from each vehicle's current location to the same vehicle's destination. In some embodiments, vehicle routing system 130 may find a defined number of alternate routes for each vehicle. In other embodiments, vehicle routing system 130 may find only routes that decrease a projected travel time for a vehicle. In some embodiments, vehicle routing system 130 may find routes that increase a travel time by less than a threshold amount of time. At step 212, vehicle management computing platform 110 may receive (e.g., via communication interface 115) the alternate routes.

Referring to FIG. 2D, at step 213, vehicle management computing platform 110 may evaluate (e.g., by processor 111 executing vehicle management module 113) each alternate route for each vehicle in order to evaluate and/or otherwise determine whether it should recommend an alternate route for the vehicle. If necessary, vehicle management computing platform 110 may send one or more requests to road conditions monitoring system 120 to receive road conditions information for roads of the alternate routes. Based on the road conditions information, the driver/vehicle information, and/or the vehicle guidance data for each vehicle and route, vehicle management computing platform 110 may select one or more alternate routes to recommend to the one or more vehicles. For example, when vehicle management computing platform 110 is optimizing a safety characteristic of traffic, it may identify alternate routes that are safer than the current route of a vehicle, and recommend the safest alternate route. As another example, when vehicle management computing platform 110 is optimizing a traffic flow characteristic, it may identify alternate routes that are less congested than the current route of the vehicle and recommend the fastest and/or least congested alternate route. Accordingly, the vehicle management computing platform 110 may further optimize one or more traffic characteristics by recommending alternate routes.

Although only vehicles having an autonomous vehicle control system 150, 160 may be selected for adjustment into or out of autonomous mode at step 210, both vehicles having an autonomous vehicle control system 150, 160 and vehicles having a non-autonomous vehicle control system 170 may be evaluated (e.g., by vehicle management computing platform 110) for route adjustments at step 213. Accordingly, vehicle management computing platform 110 may recommend alternate routes to vehicles that do not have an autonomous driving capability.

At step 214, vehicle management computing platform 110 may identify (e.g., by processor 111 executing vehicle management module 113) incentives for adjusting the autonomous mode and/or accepting a recommended alternate route for each corresponding vehicle. The vehicle management computing platform 110 may offer any kind of incentive for the vehicle. As an example, a vehicle management computing platform 110 operated by an insurance company may offer discounts on insurance coverage if the vehicle adjusts into or out of the autonomous mode and/or accepts an alternate route. As another example, a vehicle management computing platform 110 operated by a toll authority may provide free or reduced access to toll roads, special lanes, or other restricted portions of roads. In addition to or as an alternative to free or reduced goods and services, incentives may also include modifications to traffic control, such as allocating autonomous-only roads or lanes, allowing a higher speed limit for a vehicle or a group of vehicles, adjusting timing of traffic lights, and the like. For example, vehicle management computing platform 110 may cause adjustments to electronic traffic signs in order to convert certain lanes to autonomous-only lanes when above a certain percentage of vehicles are driven in an autonomous mode. As another example, vehicle management computing platform 110 may increase a speed limit (e.g., by causing adjustments to an electronic speed limit sign) when a traffic safety characteristic is optimized above a given threshold.

Vehicle management computing platform 110 may calculate the incentive to be proportional to the benefit of the adjustment. For example, a driver with a high driving score may be offered (e.g., by vehicle management computing platform 110) a relatively large incentive to switch out of autonomous mode when doing so would increase a desired safety characteristic. As another example, a vehicle may be offered (e.g., by vehicle management computing platform 110) a relatively large incentive to accept an alternate route that will take significant additional travel time, or that is significantly safer. As yet another example, a driver may be offered (e.g., by vehicle management computing platform 110) a relatively large incentive to switch to autonomous mode when the corresponding vehicle information indicates a highly-rated autonomous driving capability (e.g., due to advanced sensors or the like).

At step 215, vehicle management computing platform 110 may generate (e.g., by processor 111 executing vehicle management module 113) a message for each of the vehicles corresponding to the autonomous mode adjustments and/or the route adjustments. Vehicle management computing platform 110 may generate each message to include an indication of the incentive that will be received for making the adjustment. Vehicle management computing platform 110 may further calculate an indication of a length of time or distance during which the vehicle must continue with the adjustment in order to receive the incentive, and include an indication of such length or distance in the message. For example, an incentive may be awarded when a vehicle stays in autonomous mode for a certain amount of time, or for a certain distance, or until a certain destination is reached. Vehicle management computing platform 110 may format each message according to a format that is compatible with the autonomous vehicle control system 150, 160 or non-autonomous vehicle control system 170 contained in each corresponding vehicle. At step 216, vehicle management computing platform 110 sends out each message to each corresponding vehicle. The messages may be transmitted via network 190 to the one or more vehicles. Network 190 may include wired networks, cellular networks, satellite networks, and any other types of networks.

Figure 2E:
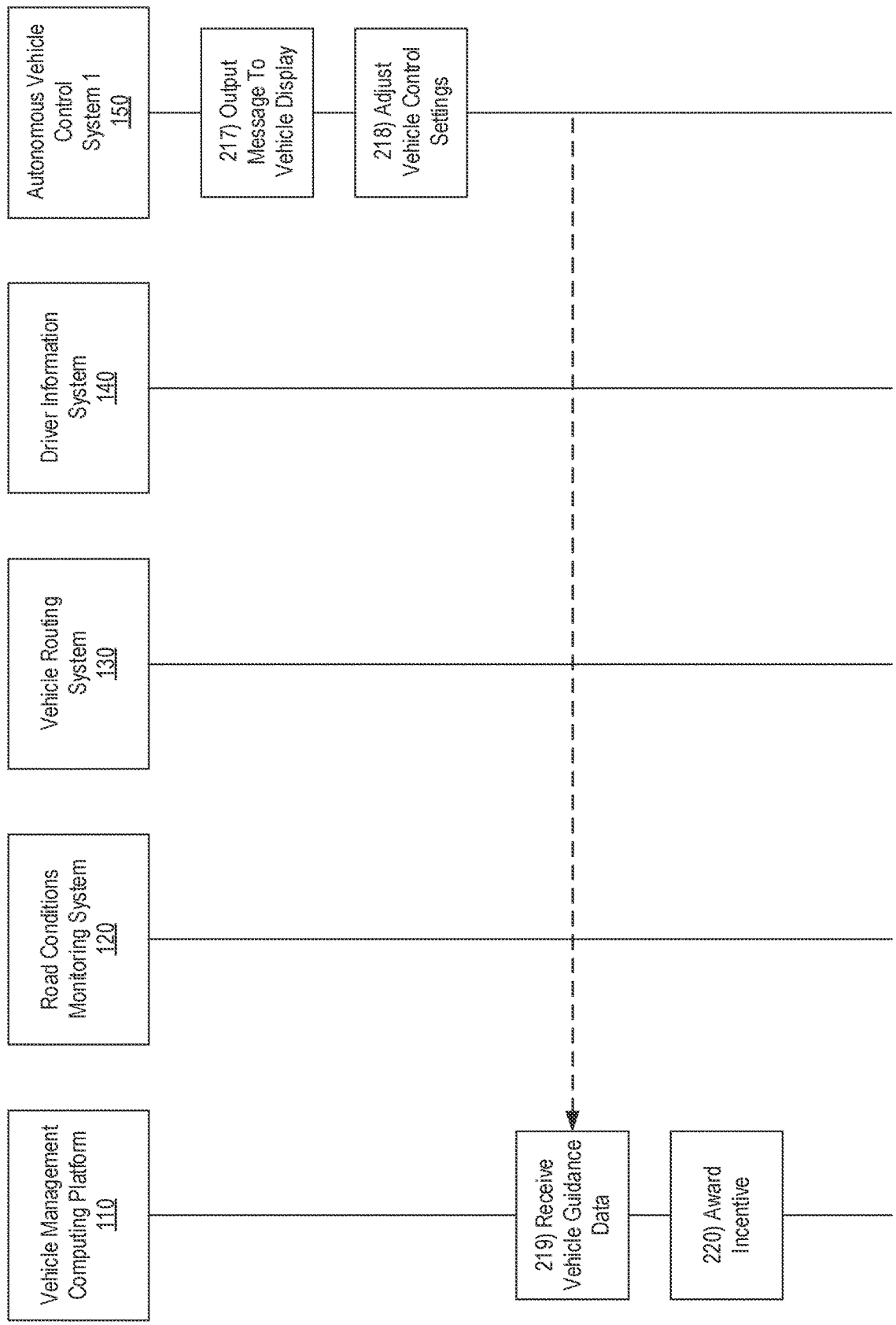

Referring to FIG. 2E, at step 217, a vehicle control system for each vehicle (e.g., autonomous vehicle control system 150) may receive (e.g., via communication interface 155) the message and output (e.g., via display 156) a corresponding user interface containing information from the message to a display. In some embodiments, autonomous vehicle control system 150 may display a user interface containing information from the message immediately upon receipt of the message. In other embodiments, autonomous vehicle control system 150 may wait to display the user interface until the user interface can be safely displayed. For example, autonomous vehicle control system 150 may wait until the vehicle is driving below a maximum speed to display the user interface. As another example, autonomous vehicle control system 150 may wait until no other objects and/or vehicles are present within a certain distance of the vehicle, or no other objects and/or vehicles are present in a certain area relative to the vehicle, such as a blind spot. As another example, autonomous vehicle control system 150 may avoid displaying the user interface when a vehicle is braking and/or turning. The autonomous vehicle control system 150 may evaluate whether the user interface can be safely displayed based on data received from sensors 157 and/or settings associated with vehicle control interfaces 159.

In some embodiments, a user interface containing information from a message may be displayed upon a screen of the vehicle (e.g., display 156). In other embodiments, the vehicle control system (e.g., autonomous vehicle control system 150) may transmit the message and/or user interface to a device connected via local device interface 158. For example, autonomous vehicle control system 150 may transmit the message and/or user interface via BLUETOOTH® for display by a smart device used by the driver and/or passengers. In some embodiments, the vehicle control system may select a smart device used by a passenger of the vehicle to display the user interface in order to avoid distracting the driver.

Figure 6:
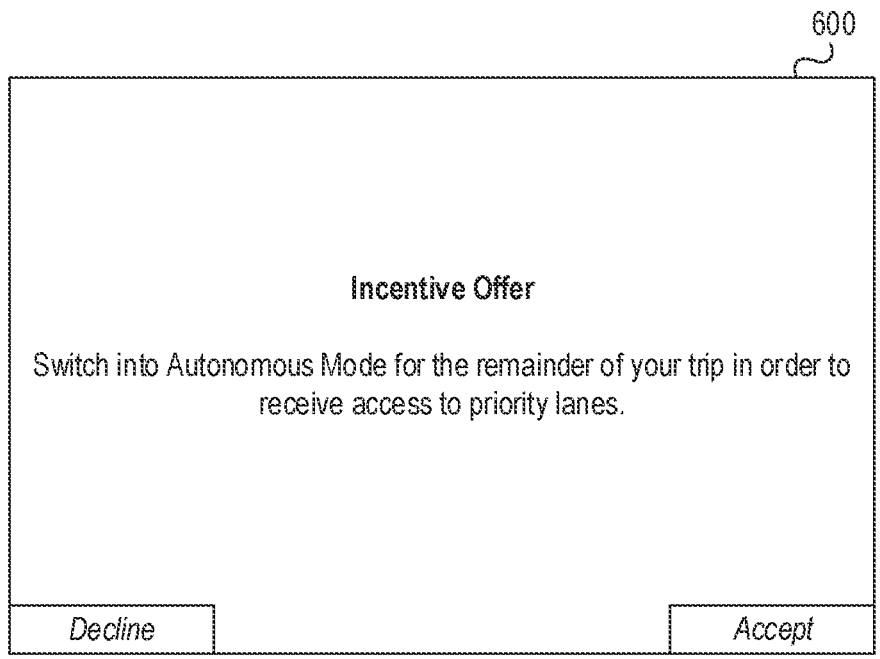
FIGS. 6 & 7 depict example graphical user interfaces for accepting incentives to adjust settings of vehicles to optimize a traffic characteristic in accordance with one or more example embodiments.
Figure 7:
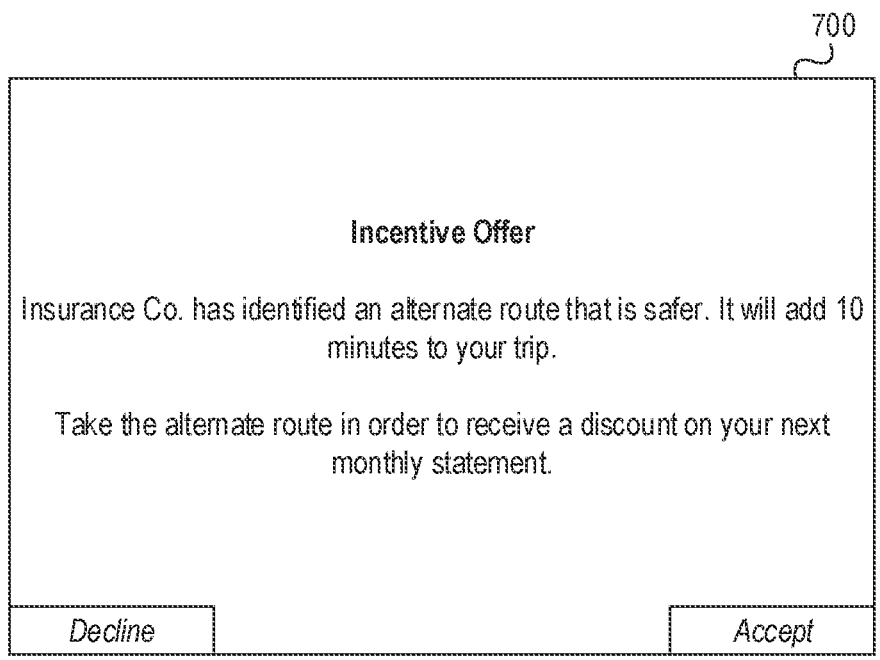

Examples of user interfaces containing information from messages are illustrated at FIGS. 6-7. As shown at FIG. 6, the message may include information indicating that a vehicle must be switched into an autonomous mode until it reaches its destination in order to receive a particular incentive. The incentive may be access to a priority lane (e.g., of a toll road or highway). The displayed user interface 600 may include options to accept or decline the incentive. In some embodiments, the vehicle control system (e.g., autonomous vehicle control system 150) may automatically decline the incentive after a certain amount of time. In these embodiments, the user interface may display a countdown or some other indication that the message is only valid for a limited time.

At step 218, when a driver or passenger of the vehicle indicates acceptance of the incentive (e.g., by selecting an "accept" option of user interface 600, 700), autonomous vehicle control system 150 may automatically adjust the vehicle into an autonomous mode. Autonomous vehicle control system 150 may modify corresponding control settings in vehicle control database 154 and/or adjust an autonomous mode via vehicle control interface 159. In some examples, the autonomous vehicle control system 150 may be configured to (upon acceptance) access priority lanes, and adjust its settings and/or route accordingly. Similarly, for an incentive to adjust the vehicle out of an autonomous mode, acceptance of the incentive may cause the autonomous vehicle control system 150 to automatically disengage the autonomous mode. In these situations, the autonomous vehicle control system 150 may display (e.g., in a user interface 600, 700) a countdown timer indicating that the autonomous mode will disengage in a certain amount of time. Additionally or alternatively, the autonomous vehicle control system 150 may wait until it senses the driver's hands on the steering wheel (e.g., via one of sensors 157) to disengage the autonomous mode.

As shown at FIG. 7, the user interface 700 may indicate an alternate route and a corresponding incentive. Upon acceptance of the incentive, autonomous vehicle control system 150 may adjust a route of the vehicle and begin following the alternate route. For a non-autonomous vehicle control system 170, accepting the incentive may cause non-autonomous vehicle control system 170 to display directions for following the alternate route (e.g., replacing user interface 700 with a navigation display).

In some embodiments, vehicle management computing platform 110 may cause the incentive to be awarded upon acceptance of multiple adjustments. For example, an incentive may be conditional upon adjusting an autonomous mode as well as accepting an alternate route. Accordingly, accepting an incentive may cause the vehicle control system to adjust multiple control settings.

In some embodiments, autonomous vehicle control system 150 may automatically accept the instructions contained in messages received from vehicle management computing platform 110. In this way, vehicle management computing platform 110 may control and/or switch an autonomous vehicle in which autonomous vehicle control system 150 is installed into an autonomous mode (or non-autonomous mode) without input from and/or action by a user of autonomous vehicle control system 150 or a passenger in the autonomous vehicle in which autonomous vehicle control system 150 is installed. Accordingly, autonomous vehicle control system 150 may adjust one or more settings without displaying a user interface or receiving a user's acceptance of an incentive. In some embodiments, autonomous vehicle control system 150 may still display a user interface (e.g., one of user interfaces 600, 700) indicating an adjustment to one or more settings without providing an option to decline or accept the adjustment. In some embodiments, the message received by autonomous vehicle control system 150 may cause autonomous vehicle control system 150 to adjust one or more settings without receiving any incentive.

At step 219, the vehicle management computing platform 110 may continue to receive (e.g., via communications interface 115) vehicle guidance data from autonomous vehicle control system 150 after adjustment of the one or more control settings by the autonomous vehicle control system 150. The vehicle guidance data received at step 219 may include a notification that the driver has accepted the incentive. Such vehicle guidance data may be used by vehicle management computing platform 110 to verify that the vehicle continues to comply with the conditions of the incentive (e.g., that a driver did not adjust back into/out of an autonomous mode or select a different route after accepting the incentive). For a non-autonomous vehicle control system 170, the vehicle guidance data may be further used by vehicle management computing platform 110 to ensure that the driver is following the alternate route indicated by the message.

Based on the vehicle guidance data from the one or more vehicles that received messages from vehicle management computing platform 110, vehicle management computing platform 110 may identify (e.g., by processor 111 executing vehicle management module 113) additional incentives to send to one or more of vehicles that received previous messages and/or other vehicles of the evaluation group. For example, vehicle management computing platform 110 may send a message containing a second offer of a larger incentive to a vehicle that declined a previous incentive. Additionally or alternatively, vehicle management computing platform 110 may send messages containing incentives to vehicles that did not previously receive messages. Accordingly, vehicle management computing platform 110 may send successive rounds of messages in order to iteratively optimize a traffic characteristic.

At step 220, vehicle management computing platform 110 causes the incentive to be awarded based on verification of acceptance and/or compliance received in vehicle guidance data at step 219. In some embodiments, partial incentives may be awarded for partial compliance. For example, if a driver accepts an incentive to switch into an autonomous mode, but later switches back out of the autonomous mode, a portion of the incentive may be awarded based on, for example, a time or distance traveled in compliance with the incentive. As another example, a driver that accepts an incentive to take a first route, but later takes a second route, may receive a partial award based on the portion of the first route followed.

Vehicle management computing platform 110 may loop back to or repeat any step at any time. In some embodiments, vehicle management computing platform 110 may periodically re-define an evaluation group at step 205, and send out additional messages in order to optimize a traffic characteristic for the re-defined evaluation group. Vehicle management computing platform 110 may continue to receive vehicle guidance data throughout the process and adjust the process according to the received vehicle guidance data. For example, when received vehicle guidance data contains an indication that one or more vehicles is stuck in a traffic jam, had an accident, or has changed routes, vehicle management computing platform 110 may define new evaluation groups at step 205, update road conditions information at steps 206-207, identify a new number of vehicles in autonomous mode in step 208, recalculate a new target number of ideal vehicles in autonomous mode in step 209, etc.

Figure 8:
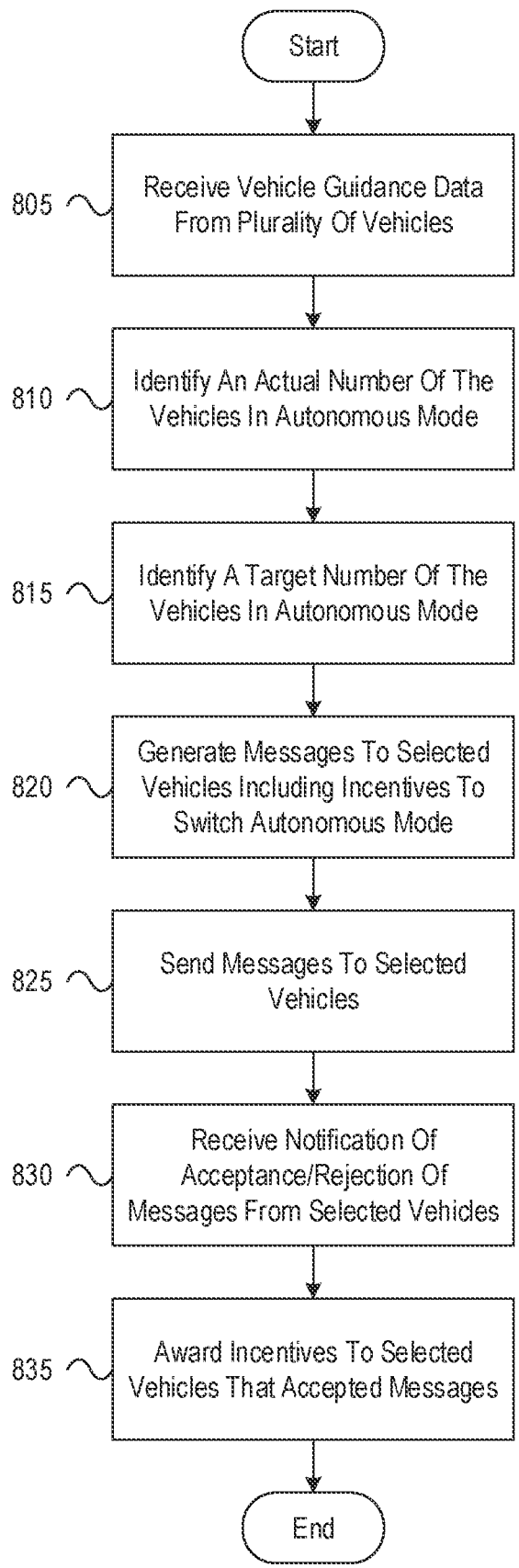
FIG. 8 depicts an illustrative method for controlling groups of autonomous vehicles to optimize traffic characteristics in accordance with one or more example embodiments.

FIG. 8 depicts an illustrative method for controlling groups of autonomous vehicles to optimize traffic characteristics in accordance with one or more example embodiments. At step 805, an autonomous vehicle management computing platform may receive vehicle guidance data from a plurality of vehicles having an autonomous mode. At step 810, the autonomous vehicle management computing platform may identify, based on the vehicle guidance data, an actual number of vehicles currently operating in the autonomous mode. At step 815, the autonomous vehicle management computing platform may identify a target number of vehicles currently operating in a non-autonomous mode to switch to the autonomous mode. At step 820, the autonomous vehicle management computing platform may, in response to identifying the target number, generate a first message instructing a first vehicle of the plurality of vehicles to present a first incentive to switch to the autonomous mode. At step 825, the autonomous vehicle management computing platform may send the first message instructing the first vehicle to present the first incentive to switch to the autonomous mode. At step 830, the autonomous vehicle management computing platform may receive a notification from the first vehicle indicating acceptance of the first incentive. At step 835, the autonomous vehicle management computing platform may, in response to the notification, cause the first incentive to be awarded to a driver of the first vehicle.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computer systems discussed above may be combined into a single computer system, and the various functions of each computer system may be performed by the single computer system. In such arrangements, any and/or all of the above-discussed communications between computer systems may correspond to data being accessed, moved, modified, updated, and/or otherwise used by the single computer system. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   determining, by a computing device, an evaluation group of vehicles for which to optimize one or more traffic characteristics;
   determining vehicles, of the evaluation group, currently operating in an autonomous mode;
   determining a target number of vehicles, of the evaluation group, for operating in the autonomous mode to optimize the one or more traffic characteristics;
   based on the target number of vehicles, selecting one or more vehicles, of the vehicles currently operating in the autonomous mode, to switch from the autonomous mode to a non-autonomous mode; and
   causing at least one vehicle of the selected one or more vehicles to switch from the autonomous mode to the non-autonomous mode.

2. The method of claim 1, wherein the selected one or more vehicles are associated with highest driver safety scores among the evaluation group.

3. The method of claim 1, wherein the selecting the one or more vehicles is based on one or more of:
   driver information associated with the one or more vehicles;
   vehicle information associated with the one or more vehicles;
   vehicle guidance data associated with the one or more vehicles; or
   road conditions information associated with the one or more vehicles.

4. The method of claim 1, wherein the causing the at least one vehicle of the selected one or more vehicles to switch from the autonomous mode to the non-autonomous mode comprises:
   sending a message instructing the at least one vehicle of the selected one or more vehicles to present an incentive to switch from the autonomous mode to the non-autonomous mode.

5. The method of claim 4, wherein the message indicates a length of time or distance during which the at least one vehicle must continue operating in the non-autonomous mode in order to receive the incentive.

6. The method of claim 4, wherein the causing the at least one vehicle of the selected one or more vehicles to switch from the autonomous mode to the non-autonomous mode is based on a selection of acceptance of the incentive.

7. The method of claim 1, wherein the determining the evaluation group of vehicles is based on one or more of:
   locations associated with vehicles of the evaluation group;
   travelling directions associated with the vehicles of the evaluation group;
   travelling speeds associated with the vehicles of the evaluation group; or destinations associated with the vehicles of the evaluation group.

8. The method of claim 1, wherein the determining the evaluation group of vehicles is based on vehicle guidance data received from vehicles of the evaluation group.

9. The method of claim 1, wherein the one or more traffic characteristics comprise one or more of:
   safety;
   a traffic flow;
   a traffic average speed; or
   a traffic maximum speed.

10. A non-transitory computer-readable storage medium having computer-executable program instructions stored thereon that when executed by a processor, cause the processor to perform steps comprising:
   determining an evaluation group of vehicles for which to optimize one or more traffic characteristics;
   determining vehicles, of the evaluation group, currently operating in an autonomous mode;
   determining a target number of vehicles, of the evaluation group, for operating in the autonomous mode to optimize the one or more traffic characteristics;
   based on the target number of vehicles, selecting one or more vehicles, of the vehicles currently operating in the autonomous mode, to switch from the autonomous mode to a non-autonomous mode; and
   causing at least one vehicle of the selected one or more vehicles to switch from the autonomous mode to the non-autonomous mode.

11. The computer-readable storage medium of claim 10, wherein the selected one or more vehicles are associated with highest driver safety scores among the evaluation group.

12. The computer-readable storage medium of claim 10, wherein the computer-executable program instructions, when executed by the processor, cause the processor to perform the causing the at least one vehicle of the selected one or more vehicles to switch from the autonomous mode to the non-autonomous mode by:
   sending a message instructing the at least one vehicle of the selected one or more vehicles to present an incentive to switch from the autonomous mode to the non-autonomous mode.

13. The computer-readable storage medium of claim 12, wherein the causing the at least one vehicle of the selected one or more vehicles to switch from the autonomous mode to the non-autonomous mode is based on a selection of acceptance of the incentive.

14. The computer-readable storage medium of claim 10, wherein the determining the evaluation group of vehicles is based on one or more of:
   locations associated with vehicles of the evaluation group;
   travelling directions associated with the vehicles of the evaluation group;
   travelling speeds associated with the vehicles of the evaluation group; or
   destinations associated with the vehicles of the evaluation group.

15. The computer-readable storage medium of claim 10, wherein the determining the evaluation group of vehicles is based on vehicle guidance data received from vehicles of the evaluation group.

16. An apparatus comprising:
   a processor; and
   a memory configured to store computer-readable instructions that, when executed by the processor, cause the apparatus to perform:
   determining an evaluation group of vehicles for which to optimize one or more traffic characteristics;
   determining vehicles, of the evaluation group, currently operating in an autonomous mode;
   determining a target number of vehicles, of the evaluation group, for operating in the autonomous mode to optimize the one or more traffic characteristics;
   based on the target number of vehicles, selecting one or more vehicles, of the vehicles currently operating in the autonomous mode, to switch from the autonomous mode to a non-autonomous mode; and
   causing at least one vehicle of the selected one or more vehicles to switch from the autonomous mode to the non-autonomous mode.

17. The apparatus of claim 16, wherein the selected one or more vehicles are associated with highest driver safety scores among the evaluation group.

18. The apparatus of claim 16, wherein the computer-readable instructions, when executed by the processor, cause the apparatus to perform the causing the at least one vehicle of the selected one or more vehicles to switch from the autonomous mode to the non-autonomous mode by:
   sending a message instructing the at least one vehicle of the selected one or more vehicles to present an incentive to switch from the autonomous mode to the non-autonomous mode.

19. The apparatus of claim 18, wherein the causing the at least one vehicle of the selected one or more vehicles to switch from the autonomous mode to the non-autonomous mode is based on a selection of acceptance of the incentive.

20. The apparatus of claim 16, wherein the determining the evaluation group of vehicles is based on one or more of:
   locations associated with vehicles of the evaluation group;
   travelling directions associated with the vehicles of the evaluation group;
   travelling speeds associated with the vehicles of the evaluation group; or
   destinations associated with the vehicles of the evaluation group.

* * * * *